(12) United States Patent
Ashida et al.

(10) Patent No.: US 9,246,814 B2
(45) Date of Patent: Jan. 26, 2016

(54) COMMUNICATION SYSTEM, CONTROL APPARATUS, COMMUNICATION NODE, AND COMMUNICATION METHOD

(75) Inventors: Yuta Ashida, Tokyo (JP); Toshio Koide, Tokyo (JP)

(73) Assignee: NEC CORPORATION, Tokyo (JP)

(*) Notice: Subject to any disclaimer, the term of this patent is extended or adjusted under 35 U.S.C. 154(b) by 104 days.

(21) Appl. No.: 13/983,539

(22) PCT Filed: Feb. 6, 2012

(86) PCT No.: PCT/JP2012/052612
§ 371 (c)(1),
(2), (4) Date: Aug. 2, 2013

(87) PCT Pub. No.: WO2012/108382
PCT Pub. Date: Aug. 16, 2012

(65) Prior Publication Data
US 2013/0308462 A1 Nov. 21, 2013

(30) Foreign Application Priority Data
Feb. 7, 2011 (JP) ................................. 2011-024045

(51) Int. Cl.
*H04L 12/801* (2013.01)
*H04L 12/751* (2013.01)
*H04L 12/24* (2006.01)

(52) U.S. Cl.
CPC ............... *H04L 47/10* (2013.01); *H04L 45/02* (2013.01); *H04L 41/12* (2013.01)

(58) Field of Classification Search
CPC ............................... H04L 47/10; H04L 45/02
See application file for complete search history.

(56) References Cited

U.S. PATENT DOCUMENTS

| 6,026,077 A | 2/2000 | Iwata |
| 7,593,340 B2 | 9/2009 | Li et al. |

(Continued)

FOREIGN PATENT DOCUMENTS

| JP | H10-145362 A | 5/1998 |
| JP | 2004-129135 A | 4/2004 |

(Continued)

OTHER PUBLICATIONS

International Search Report dated Mar. 13, 2012 in PCT/JP2012/052612, with English translation thereof.

(Continued)

*Primary Examiner* — Brian D Nguyen
*Assistant Examiner* — Toan Nguyen
(74) *Attorney, Agent, or Firm* — McGinn IP Law Group, PLLC.

(57) ABSTRACT

A communication system includes: a plurality of communication nodes; and a control apparatus that controls packet processing of the plurality of communication nodes. The control apparatus further includes: a virtualization unit that configures a virtual node(s) from a plurality of communication nodes among the plurality of communication nodes; a control unit that sets a processing rule for a packet in at least one communication node of the plurality of communication nodes included in the virtual node(s), so that the at least one communication node executes packet processing corresponding to an operation of the virtual node(s); and a path calculation unit that calculates a forwarding path of a packet, based on a virtual network topology including the virtual node(s). The plurality of communication nodes process a packet corresponding to the forwarding path, in accordance with the processing rule.

20 Claims, 12 Drawing Sheets

(56) References Cited

U.S. PATENT DOCUMENTS

| | | | |
|---|---|---|---|
| 8,065,721 B1* | 11/2011 | Shah | 726/13 |
| 2004/0047353 A1 | 3/2004 | Umayabashi et al. | |
| 2004/0081105 A1 | 4/2004 | Shimazaki et al. | |
| 2008/0002664 A1 | 1/2008 | Li et al. | |
| 2010/0100616 A1* | 4/2010 | Bryson et al. | 709/223 |
| 2010/0290385 A1* | 11/2010 | Ankaiah et al. | 370/315 |
| 2010/0309820 A1* | 12/2010 | Rajagopalan et al. | 370/256 |
| 2011/0202675 A1* | 8/2011 | Faulk, Jr. | 709/238 |
| 2011/0261825 A1 | 10/2011 | Ichino | |

FOREIGN PATENT DOCUMENTS

| | | |
|---|---|---|
| JP | 2004-140776 A | 5/2004 |
| JP | 2008-211550 A | 9/2008 |
| JP | 2009-539156 A | 11/2009 |
| WO | WO 2010/103909 A1 | 9/2010 |

OTHER PUBLICATIONS

Nick McKeown, and seven others, "OpenFlow: Enabling Innovation in Campus Networks," [online] [search conducted Feb. 7, 2011], Internet<URL:http://www.openflowswitch.org//documents/openflow-wp-latest.pdf>.

"OpenFlow Switch Specification" Version 1.0.0. (Wire Protocol 0x01) [search conducted Feb. 7, 2011], Internet<URL:http://www.openflowswitch.org/documents/openflow-spec-v1.0.0.pdf>.

Chiba, Yasunobu, and two others, "A Proposal of Flow Entry Reduction Scheme for Flow-based Networks and Its Implementation on OpenFlow-based Network," The Institute of Electronics, Information and Communication Engineers, Technical Report, vol. 109, No. 448, NSZ009-163, pp. 7-12.

Communication Engineers, Technical Report, vol. 109, No. 448, NS2009-163, pp. 7-12.

Japanese Office Action dated Nov. 4, 2015 with English Translation.

* cited by examiner

FIG. 12

| ACTION NAME | ACTION CONTENT |
|---|---|
| OUTPUT | OUTPUT TO SPECIFIED PORT |
| SET_VLAN_VID | ADD, UPDATE VLAN Tag BY SPECIFIED VLAN ID |
| SET_VLAN_PCP | ADD, UPDATE VLAN Tag BY SPECIFIED VLAN PRIORITY |
| STRIP_VLAN | UNSET IEEE802.1q VLAN Tag |
| SET_DL_SRC | UPDATE MAC SA |
| SET_DL_DST | UPDATE MAC DA |
| SET_NW_SRC | UPDATE IP SA |
| SET_NW_DST | UPDATE IP DA |
| SET_TP_SRC | UPDATE TCP/UDP Source Port |
| SET_TP_DST | UPDATE TCP/UDP Destination Port |
| VENDOR | VENDOR DEFINED ACTION |

Related Art

COMMUNICATION SYSTEM, CONTROL APPARATUS, COMMUNICATION NODE, AND COMMUNICATION METHOD

CROSS-REFERENCE TO RELATED APPLICATION

This application is based upon and claims the benefit of the priority of Japanese patent application No. 2011-024045 filed on Feb. 7, 2011, the disclosure of which is incorporated herein in its entirety by reference thereto.

TECHNICAL FIELD

The present invention relates to a communication system, a control apparatus, a communication node, and a communication method, and in particular to a communication system that virtualizes a node in a network to forward a packet, a control apparatus that controls communication in the communication system, a communication node, and a communication method.

BACKGROUND

Technology known as OpenFlow is disclosed in Non-Patent Literatures (NPLs) 1 and 2. In OpenFlow, communication is taken as end-to-end flow, and path control, recovery from failure, load balancing and optimization are performed in flow units. An OpenFlow switch functioning as a forwarding node is provided with a secure channel for communication with an OpenFlow controller and operates in accordance with a flow table for which appropriate addition or rewriting is prescribed by the OpenFlow controller. The flow table has definitions of sets of: rules (FlowKey, matching key) for matching with packet headers, actions (Action) defining processing content, and flow statistical information (Stats), for each flow.

FIG. 12 shows an example of action name(s) and action content(s) defined in Non-Patent Literature 2. OUTPUT is an action to output a packet to a designated port (interface), and SET_VLAN_VID to SET_TP_DST are actions to modify fields of a packet header.

For example, on receiving a first packet, the OpenFlow switch searches for an entry having a rule (FlowKey) that matches header information of the received packet, from the flow table. As a result of the search, in a case where an entry matching the received packet is found, the OpenFlow switch implements processing content described in an action field of the entry in question, with regard to the received packet. On the other hand, as a result of the search, in a case where an entry matching the received packet is not found, the OpenFlow switch forwards the received packet to the OpenFlow controller via the secure channel, requests determination of a packet path based on source and destination of the received packet, receives a flow entry realizing this, and updates the flow table.

Thus, in OpenFlow, fine grained path control for each flow is possible, but flow entry configuration load increases due to increase in the number of flows. Therefore, with technology disclosed in Non Patent Literatures 1 and 2, there is a risk that the load for setting of flow entries will become large, when application is made to a large scale network.

Non Patent Literature 3 discloses a solution strategy for this problem. Non Patent Literature 3 describes a list of processes to be performed in packet header parts by respective OpenFlow switches, instead of defining an entry for each flow, with regard to a flow table provided in a normal OpenFlow switch. In this way, the abovementioned problem is solved.

For example, as shown in FIG. 11, for each OpenFlow switch an action where the switch may be executed is defined, and an address is attached to each action. With regard to a packet, embedded in the packet header is a series of pointers indicating addresses of actions to be executed by the respective OpenFlow switches according to a series of OpenFlow switches passed through. The OpenFlow switches perform forwarding by reading the pointer series in the packet header and calling respective actions to be executed thereby. According to this method, it is possible to forward packets without setting flow entries when a packet is received, and it is possible to reduce delay upon forwarding.

On the other hand, Patent Literature (PTL) 1 describes technology related to packet forwarding in a large scale network. Patent Literature 1 describes a route calculation method of high calculation efficiency, in a large scale network formed by a plurality of domains. The method described in Patent Literature 1 defines the domains hierarchically, and deploys a PCE (Path Calculation Element) in the respective hierarchical domains Route calculation is performed for each layer; an upper level PCE determines input and output nodes for lower level domains; the route calculation is executed in parallel by requesting the lower level domains to perform calculation tasks; and the route calculation is provided in a network formed by a plurality of domains.

PTL 1:
Japanese Patent Kohyo Publication No. JP2009-539156A

NPL 1:
Nick McKeown, and seven others, "OpenFlow: Enabling Innovation in Campus Networks," [online] [search conducted Feb. 7, 2011], Internet<URL:http://www.openflowswitch.oredocuments/openflow-wp-latest.pd.

NPL 2:
"OpenFlow Switch Specification" Version 1.0.0. (Wire Protocol 0x01) [search conducted Feb. 7, 2011], Internet<URL:http://www.openflowswitch.org/documents/openflow-spec-v1.0.0.pd.

NPL 3:
Chiba, Yasunobu, and two others, "A Proposal of Flow Entry Reduction Scheme for Flow-based Networks and Its Implementation on OpenFlow-based Network," The Institute of Electronics, Information and Communication Engineers, Technical Report, Vol. 109, No. 448, NS2009-163, pp. 7-12.

SUMMARY

The respective disclosures of the abovementioned Patent Literature and Non-Patent Literature are incorporated herein by reference thereto. The following analysis is given by the inventors of the present invention.

According to a method described in Non Patent Literature 3, in a case of application to a network handling a high proportion of very long communication paths as in a wide area network, a new problem occurs due to increase in packet header length. In a case where packet headers have descriptions of processing pointers for all switches to be passed through, the packet header lengths become large, leading to a negative effect on communication efficiency. In a case of limiting packet header length to less than or equal to a fixed value, processing is necessary to describe, in the packet header, process pointers as far as an intermediate part of the communication path, and to re-describe, in the path header, process pointers corresponding to the remaining path. Therefore, since the process pointers are re-described in the packet header, communication traffic between a control apparatus and switches is generated, and load on the switches and control apparatus increases.

On the other hand, technology described in Patent Literature 1 can be applied to a system that controls communication in units of flow in a large scale network. However, since there is a possibility of route calculation requests increasing according to the number of flows, PCE load increases in a large scale network controlling communication in units of flow. Since route setting may be done for every flow, there is a problem in that the number of flow entries becomes very large. Furthermore, each time a new flow that is a control target is generated, path calculation over all hierarchical domains is executed. That is, every time a new flow is generated, path re-calculation is necessary with granularity of physical nodes (that is, communication nodes) that configure the network. In a case of path calculation with granularity of physical nodes, there is a problem in that entities that are path calculation targets increase in number, and calculation load increases.

Accordingly, there is a need in the art to enable execution of flow control at high speed and with low load in a large scale network.

According to a first aspect of the present invention, there is provided a communication system, comprising: a plurality of communication nodes; and a control apparatus that controls packet processing of the plurality of communication nodes. The control apparatus further comprises: a virtualization unit that configures a virtual node(s) from a plurality of communication nodes among the plurality of communication nodes; a control unit that sets a processing rule for a packet in at least one communication node of the plurality of communication nodes included in the virtual node(s), so that the at least one communication node executes packet processing corresponding to an operation of the virtual node(s); and a path calculation unit that calculates a forwarding path(s) of a packet, based on a virtual network topology including the virtual node(s). The plurality of communication nodes process a packet corresponding to the forwarding path, in accordance with the processing rule.

According to a second aspect of the present invention, there is provided a control apparatus that controls packet processing of a plurality of communication nodes. The control apparatus comprises: a virtualization unit that configures a virtual node(s) including a plurality of communication nodes among the plurality of communication nodes; a control unit that sets a processing rule for a packet in at least one communication node of the plurality of communication nodes included in the virtual node(s), so that the at least one communication node executes packet processing corresponding to an operation of the virtual node(s); and a path calculation unit that calculates a forwarding path of a packet, based on a virtual network topology including the virtual node(s).

According to a third aspect of the present invention, there is provided a communication method, comprising: configuring, by a control apparatus that controls packet processing of a plurality of communication nodes, a virtual node(s) from a plurality of communication nodes among the plurality of communication nodes; setting a processing rule for a packet in at least one communication node of the plurality of communication nodes included in the virtual node(s), so that the at least one communication node executes packet processing corresponding to an operation of the virtual node(s); and calculating a forwarding path of a packet, based on a virtual network topology including the virtual node(s).

According to a fourth aspect of the present invention, there is provided a communication node, that is used in a communication system comprising a control apparatus that controls packet processing of a plurality of communication nodes. The communication node is one communication node among the plurality of communication nodes. The control apparatus further comprises: a virtualization unit that configures a virtual node(s) from a plurality of communication nodes among the plurality of communication nodes; a control unit that sets a processing rule for a packet in at least one communication node of the plurality of communication nodes included in the virtual node(s), so that the at least one communication node executes packet processing corresponding to an operation of the virtual node(s); and a path calculation unit that calculates a forwarding path of a packet, based on a virtual network topology including the virtual node(s). The communication node processes a packet corresponding to the forwarding path in accordance with the processing rule.

The present invention provides the following advantage, but not restricted thereto. According to the communication system, the control apparatus, the communication node and the communication method of the present invention, it is possible to execute flow control at high speed and with low load in a large scale network.

BRIEF DESCRIPTION OF THE DRAWINGS

FIG. 12 is a diagram showing action name and action content defined in Non Patent Literature 2.

PREFERRED MODES

Figure 1:
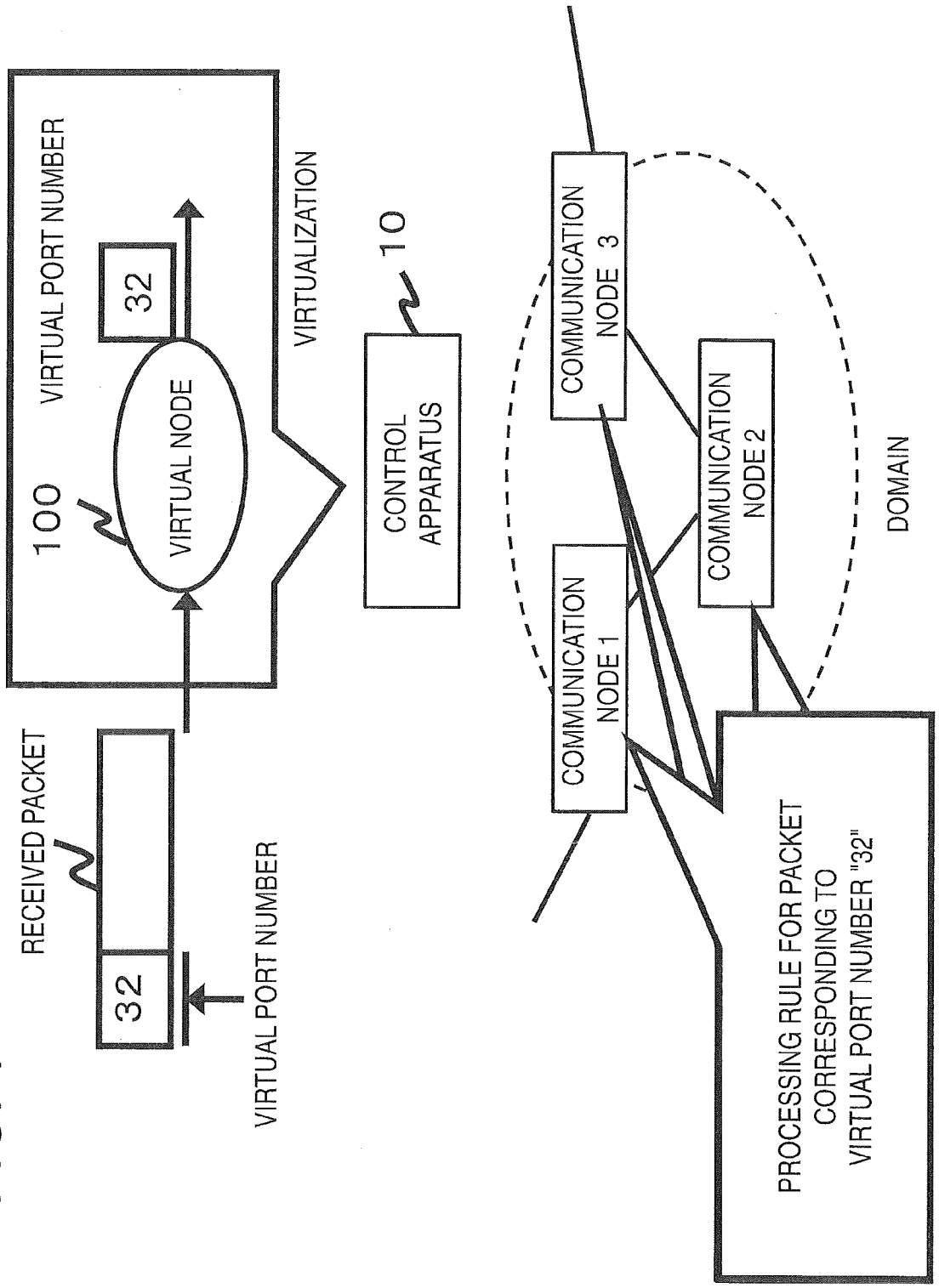
FIG. 1 is a diagram describing an outline of the present invention.

In the present disclosure, there are various possible modes, which include the following, but not restricted thereto. First, an outline of the present invention is described, making reference to FIG. 1. It is to be noted that reference symbols in the drawings attached to this outline are examples used solely in order to aid understanding and are not intended to limit the present invention to modes shown in the drawings.

Communication nodes 1 to 3 process packets in accordance with control by a control apparatus 10. The control apparatus 10 controls forwarding of packets by the respective communication nodes by setting a processing rule prescribing a packet processing method, in the communication nodes 1 to 3.

The control apparatus 10 virtualizes the communication nodes 1 to 3 that are controlled by the control apparatus 10, and generates a virtual node 100. The control apparatus 10 assigns a virtual port number to a link by which the virtual node 100 is connected to another virtual node. The virtual node 100 forwards a packet that includes an identifier corresponding to the virtual port number, from the link with the virtual port number that corresponds to the identifier. In FIG. 1, the virtual port number "32" is assigned to the virtual node 100.

The control apparatus 10 sets a processing rule in each communication node so that the communication node performs an operation corresponding to packet forwarding by the virtual node 100. In the example of FIG. 1, the control apparatus 10 sets a processing rule prescribing packet processing (for example, a process of forwarding a packet to a prescribed port, or the like) corresponding to a packet corresponding to the virtual port number "32," in each communication node.

After setting the processing rule, a processing device (communication nodes 1 to 3) calculates a path for packet forwarding, based on a virtualized network topology. With regard to topology according to a virtualized domain, since the number of hops and management entities is less than with a topology configured by (including) the original communication nodes, path calculation load is reduced. The control apparatus 10 sets various communication paths for each of various types of packet communication (that is, packet flows). If a virtualized network is once built, the control apparatus 10 need not perform setting of processing rules and path calculation giving consideration to the real topology according to the respective communication nodes, even when a new flow requiring setting of a forwarding path is generated. This is because processing rules corresponding to the virtualized network topology are set for communication nodes.

The following modes are possible in the present invention.
(Mode 1)
A communication system may be a communication system according to the abovementioned first aspect.
(Mode 2)
The control unit may set the processing rule in at least one of the plurality of communication nodes included in the virtual node(s), so that a packet is forwarded to a communication node corresponding to a virtual port of the virtual node(s).
(Mode 3)
The control unit may associate the processing rule with an identifier representing a virtual port of the virtual node(s) and set the association in at least one of the plurality of communication nodes included in the virtual node(s).
(Mode 4)
The plurality of communication nodes, in a case of receiving a packet corresponding to the identifier, may process the packet in accordance with the processing rule associated with the identifier.
(Mode 5)
The plurality of communication nodes, in a case of receiving a packet including the identifier, may process the packet in accordance with the processing rule associated with the identifier.
(Mode 6)
A communication node corresponding to the virtual port, when processing a packet including the identifier, may process the packet so that the identifier is not referred to by another communication node.

(Mode 7)
A control apparatus may be a control apparatus according to the abovementioned second aspect.
(Mode 8)
The control unit may set the processing rule in at least one of the plurality of communication nodes included in the virtual node(s), so that a packet is forwarded to a communication node corresponding to a virtual port of the virtual node(s).
(Mode 9)
The control unit may associate the processing rule with an identifier representing a virtual port of the virtual node(s) and set the association in at least one of the plurality of communication nodes included in the virtual node(s).
(Mode 10)
A communication method may be a communication method according to the abovementioned third aspect.
(Mode 11)
The communication method may include: by the plurality of communication nodes, processing a packet corresponding to the forwarding path, in accordance with the processing rule.
(Mode 12)
The communication method may include: by the control apparatus, setting the processing rule in at least one of the plurality of communication nodes included in the virtual node(s), so that a packet is forwarded to a communication node corresponding to a virtual port of the virtual node(s).
(Mode 13)
The communication method may include: by the control apparatus, associating the processing rule with an identifier representing a virtual port of the virtual node(s) and setting the association in at least one of the plurality of communication nodes included in the virtual node(s).
(Mode 14)
The communication method may comprise: by the plurality of communication nodes, in a case of receiving a packet corresponding to the identifier, processing the packet in accordance with the processing rule associated with the identifier.
(Mode 15)
The communication method may comprise: by the plurality of communication nodes, in a case of receiving a packet including the identifier, processing the packet in accordance with the processing rule associated with the identifier.
(Mode 16)
The communication method may comprise: by the communication node corresponding to the virtual port, when processing a packet including the identifier, processing the packet so that the identifier is not referred to by another communication node.

Exemplary Embodiment

Figure 2:
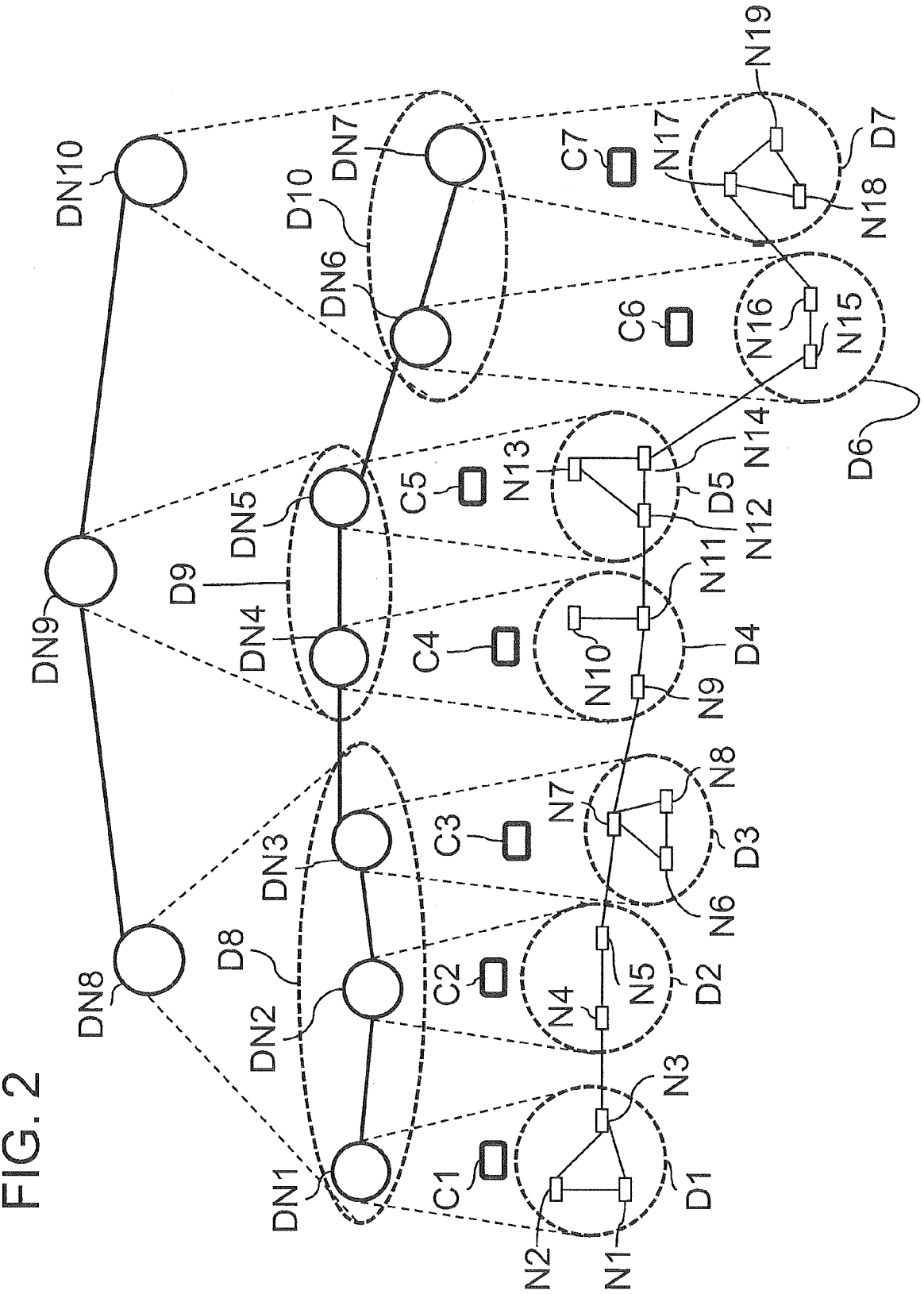
FIG. 2 is a diagram showing a configuration example of a communication system according to an exemplary embodiment.

A description is given concerning a communication system according an exemplary embodiment, making reference to the drawings. FIG. 2 is a diagram showing a configuration of the communication system according the present exemplary embodiment and a virtual network provided by the present exemplary embodiment.

With reference to FIG. 2, N1 to N19 represent communication nodes, and C1 to C7 represent control apparatuses that control the communication nodes. Each control apparatus sets a processing rule determining a processing method of a packet belonging to a certain flow, in a communication node controlled by the control apparatus. Each communication node holds the processing rule that has been set by the control apparatus, in a table. Each communication node searches the table for a processing rule corresponding to a received packet and executes processing (packet forwarding or the like) of the received packet according to the corresponding processing rule. In a case where a processing rule corresponding to the received packet is not present in the table, the communication node makes a request to the control apparatus to set a processing rule corresponding to the received packet. By an operational example as described above, the control apparatus performs centralized control of communication nodes under its supervision.

With reference to FIG. 2, the communication system is provided with communication nodes N1 to N3, N4 to N5, N6 to N8, N9 to N11, N12 to N14, N15 to N16, and N17 to N19, and control apparatuses C1 to C7 that control these. The communication nodes are connected by links represented by full lines, and are included in domains D1, D2, D3, D4, D5, D6 and D7, respectively. Domain boundaries are shown by broken lines in FIG. 2.

Domains D1 to D3, D4 to D5, and D6 to D7 are included in respective upper level domains: D8, D9 and D10.

Control of the upper level domains D8, D9 and D10 is performed by the respective control apparatuses (C1 to C7) included in lower level domains.

The respective control apparatuses (C1 to C7) virtualize domains they manage as domain nodes included in the upper level domains. That is, the domain nodes function as virtual nodes. For example, in FIG. 2 the control apparatus C1 virtualizes the domain D1, which includes the communication nodes N1 to N3, as a domain node DN1 of the upper level domain D8. In other words, the control apparatus C1 virtualizes the domain D1, which includes the communication nodes N1 to N3, as one virtual communication node (DN1). The domain nodes DN1 to DN10 respective correspond to the domains D1 to D10.

Virtualization is performed by setting in the communication nodes a processing rule to forward packets to links (egress links) corresponding to respective domain exits. For example, in domain D1, an egress link forms a link connecting the communication nodes N3 and N4. In the processing rule, a unique identifier is assigned as a virtual port number of a domain node, to each egress link of a domain. By making a correspondence between a virtual port number and a processing rule, it is possible to output an input packet from an arbitrary node to outside a domain by specifying a port number that is common in the domain. That is, by a communication node processing a packet in accordance with a processing rule corresponding to an identifier, virtual packet forwarding by a domain node is realized. In a case of forwarding a packet from a prescribed virtual port of a domain node, each communication node belonging to the domain node forwards the packet directed to an egress link, in accordance with a processing rule corresponding to the identifier of the virtual port. Therefore, virtually, the packet is forwarded from the virtual port of the domain node.

The control apparatus virtualizes the communication node of the domain to a virtualized communication node (domain node). Therefore, the egress link of the domain corresponds to the virtual port in the domain node. The domain node configured by virtualization executes communication between domain nodes by forwarding a packet to the virtual port. In reality, communication nodes corresponding to respective domain nodes forward packets, but the control apparatus virtualizes packet forwarding by a communication node to packet forwarding by a domain node.

The control apparatus uses a processing rule in order to virtualize packet forwarding by a communication node to packet forwarding by a domain node. In order to forward a packet from a virtual port of a virtualized domain node, the control apparatus sets a processing rule prescribing a process for forwarding the packet towards an egress link of a domain, in a communication node under its supervision.

Figure 3:
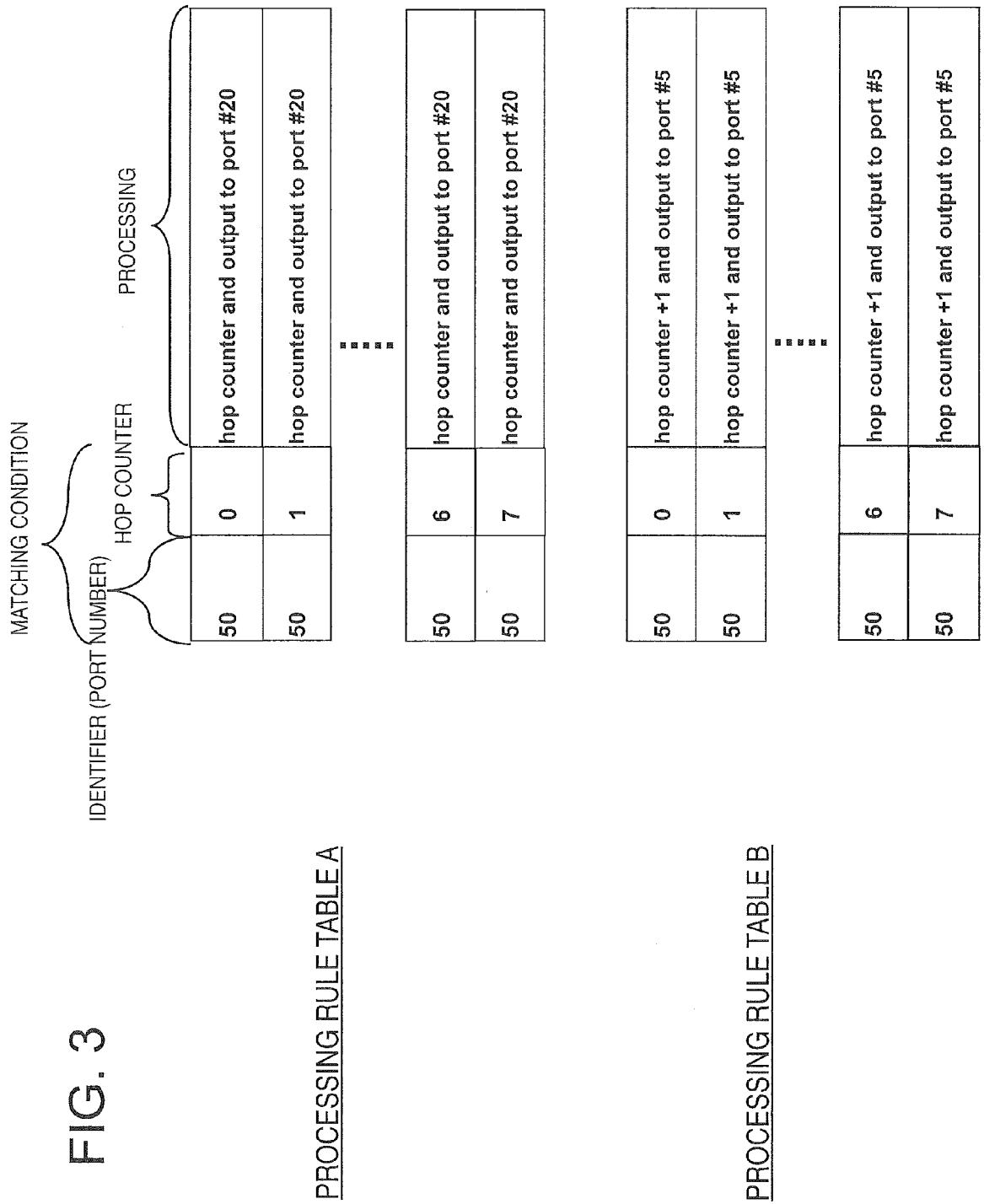
FIG. 3 is a diagram showing an example of a table that stores processing rules to be set in a communication node.

For example, a domain node is virtualized by assigning a virtual port number 50 to an egress link of a certain domain. FIG. 3 shows two types of processing rule table to be set in a communication node included in the domain for virtualization to a domain node. The processing rule table A represents a processing rule to be set in a communication node that does not have a domain egress link. On the other hand, the processing rule table B represents a processing rule to be set in a communication node that has a domain egress link.

An identifier array relates to an identifier group associated with a processing rule, stored in the header of a packet received by a communication node. A hop counter is a counter used for identifying an identifier to be referred to, in an identifier array stored in the header of a packet received by a communication node. The identifier and the hop counter together form a condition for matching a packet header.

For example, in a case of receiving a packet in which a port number "50" is set as an identifier and "0" is set as a counter, the communication node processes the packet in accordance with an entry of the first line of the processing rule table A. In a case where the header of a received packet coincides with a matching condition, content stored in the "processing" field is a process to be executed by the communication node for the received packet. Here, a means for identifying an identifier by the communication node is a hop counter, but other means are also possible, such as not installing a hop counter, but always referring to the top identifier, and deleting an identifier that has already been referred to.

A communication node in which a processing rule of the processing rule table A is set, is a communication node that does not have an egress link. When a packet including the virtual port number 50 in a processing rule line in a packet header is inputted to a communication node, the processing rule of the processing rule table A is a rule to execute a process for outputting to a port number towards a domain egress link. Port numbers described in a processing field of FIG. 3 differ according to communication node, and represent output ports used in forwarding from respective communication nodes to egress links.

A communication node in which a processing rule of the processing rule table B is set, is a communication node that has an egress link. In a processing rule in a communication node having an egress link, in a case where a packet having a packet header that coincides with a matching condition is inputted, a hop counter is incremented, and thereafter output to an egress link is performed. By this processing, a packet that has reached a communication node that is an output destination of an egress link is processed by referring to the next identifier.

By setting the processing rule as described above, when an arbitrary communication node within a domain receives a packet containing an identifier "50" in a packet header, the packet is forwarded with a single identifier until outputted to an egress link corresponding to the identifier "50," and it is possible to specify forwarding to outside the domain by the single identifier.

Figure 4:
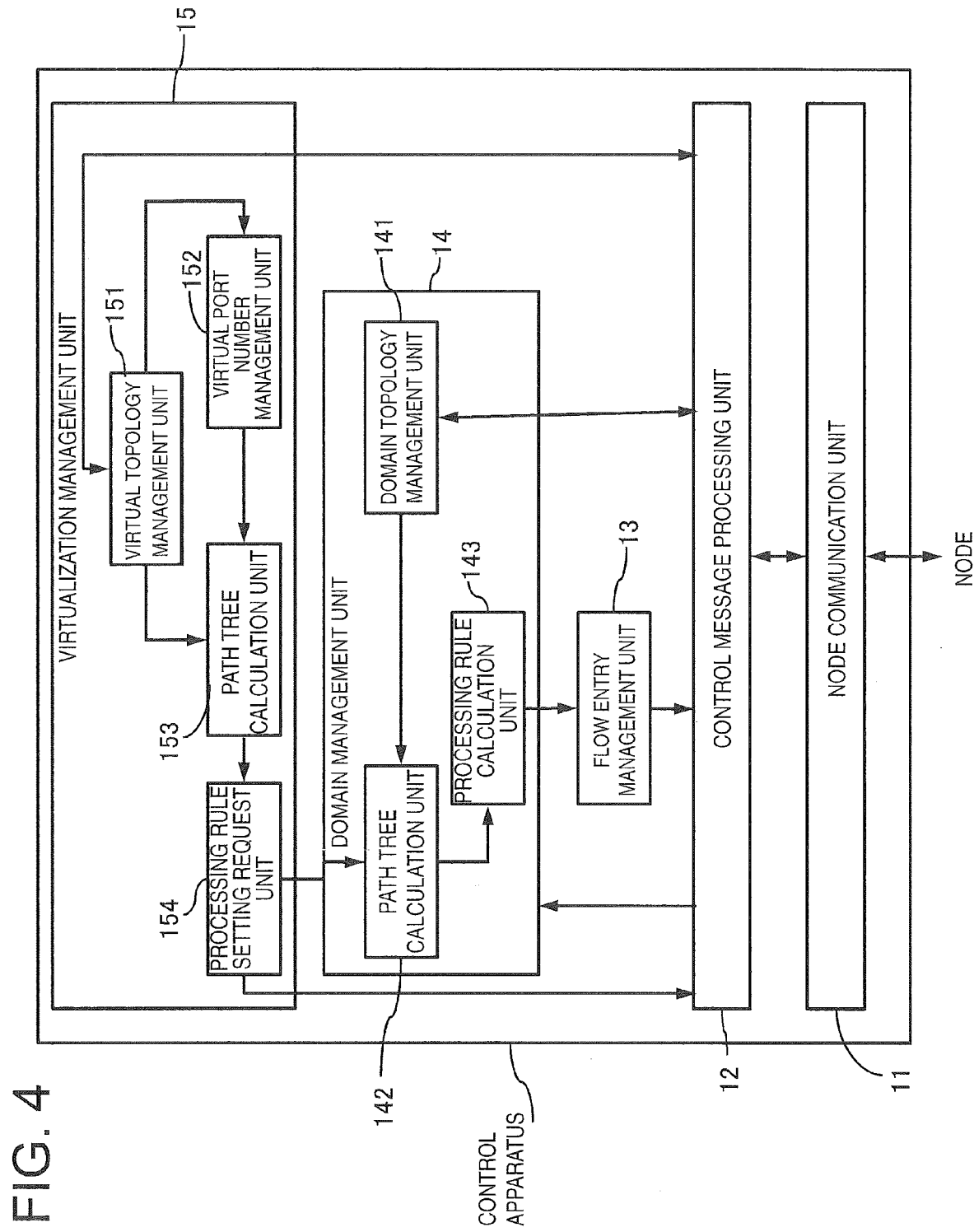
FIG. 4 is a block diagram representing a configuration example of a control apparatus in an exemplary embodiment.

FIG. 4 is a block diagram showing an example of a configuration of the control apparatus. Referring to FIG. 4, the control apparatus is provided with a node communication unit 11, a control message processing unit 12, a flow entry management unit 13, a domain management unit 14, and a virtualization management unit 15.

The node communication unit 11 communicates with a communication node. The control apparatus, when performing virtualization, may communicate with another control apparatus. In this case, the control apparatus communicates with the other control apparatus using the node communication unit 11. The control message processing unit 12 performs processing by converting control content to a communication node, to a control message, or by analyzing a control message from the communication node. The flow entry management unit 13 generates and manages a processing rule related to packet processing in the communication node. The domain management unit 14 controls a domain it manages. The virtualization management unit 15 controls a plurality of lower level domains as one upper level domain.

A description is given concerning component elements of the domain management unit 14. With reference to FIG. 4, the domain management unit 14 is provided with a domain topology management unit 141, a path tree calculation unit 142, and a processing rule calculation unit 143.

The domain topology management unit 141 manages topology information of the lowest level domains D1 to D7 (that is, domains configured by communication nodes). The path tree calculation unit 142 calculates a path within the respective lowest level domains, that is, a path towards a communication node corresponding to an egress link, based on topology of the lowest level domains. The processing rule calculation unit 143 generates a processing rule from a calculation result of the path tree calculation unit 142.

Next, a description is given concerning respective component elements of the virtualization management unit 15. With reference to FIG. 4, the virtualization management unit 15 is provided with a virtual topology management unit 151, a virtual port number management unit 152, a path tree calculation unit 153, and a processing rule setting request unit 154.

The virtual topology management unit 151 manages virtual topology configured from respective hierarchical virtualized domains or connection relationships of respective domain nodes. When a certain domain is virtualized as a domain node, the virtual port number management unit 152 assigns a virtual port number to a link port connected to another domain node. The virtual port number management unit 152 has a database for assigning the virtual port numbers. The path tree calculation unit 153 calculates a path within a domain, that is, a path towards a domain node corresponding to a domain egress link port connected to another domain. The abovementioned domain egress link port represents a virtual port of a domain node corresponding to a link that is an exit to another domain, among domain nodes within the domain. The processing rule setting request unit 154 makes a request to the domain management unit 14 to set a processing rule in accordance with a virtual port number specified by the virtual port number management unit 152 and a path tree calculated by the path tree calculation unit 153 corresponding thereto.

As described above, the control apparatus sets a processing rule in the communication node based on a calculation result of the path tree calculation units 142 and 153. This operation is executed, for example, when the communication system is initialized. The control apparatus sets processing rules corresponding to respective domains built by hierarchical virtualization of the network, in communication nodes. Thus, after setting a processing rule, a processing device may perform calculation only, based on topology according to the virtualized domain, with regard to a path for packet forwarding. With respect to topology according to the virtualized domain, since the number of hops and management entities is less than with a topology configured by the communication nodes, path calculation load is reduced. Furthermore, since the virtualized topology has fewer hops than a topology according to the communication nodes, it is possible to reduce the number of queries to set a path to the control apparatus during packet forwarding. Moreover, since the control apparatus can control a packet forwarding path according to topology configured hierarchically, it is possible to flexibly control granularity of the forwarding path.

Next, a description is given of an operational example in which the control apparatus virtualizes communication nodes and builds a virtual network.

Figure 5:
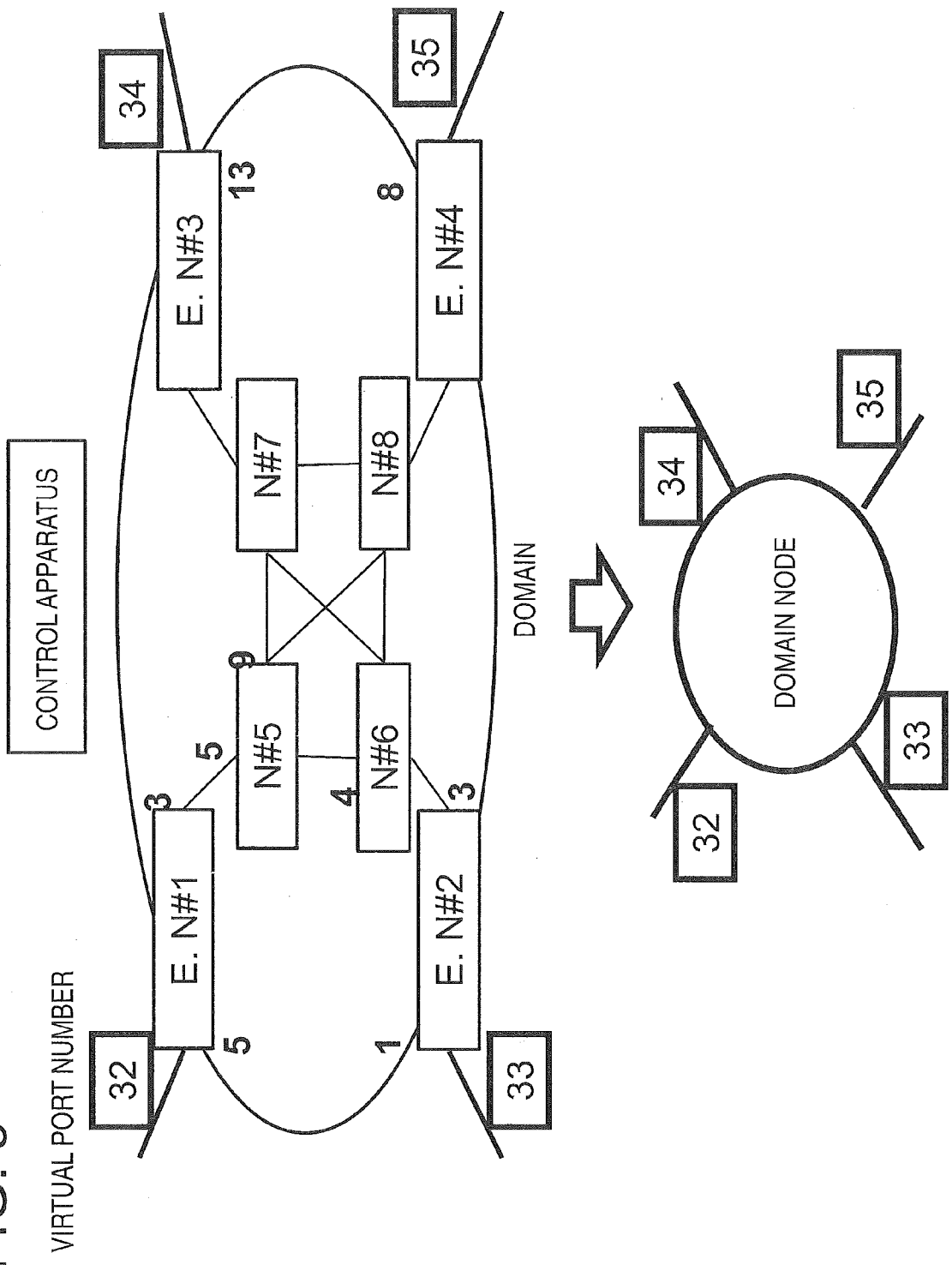
FIG. 5 is a diagram for describing an operational example of the exemplary embodiment.

FIG. 5 shows an operational example in which a domain configured by communication nodes is virtualized to a domain node. N#1 to N#8 belong to a domain under supervision of the control apparatus. N#1 to N#4 have "E" attached as a prefix. This "E" indicates a communication node corresponding to an external link of the domain. The external link indicates a link by which the domain is connected to another domain, that is, an egress link. It is to be noted that communication nodes N#1 to N#8 are used in order to describe the operational example and have no relation with communication nodes N1 to N19 shown in FIG. 2 and the like.

Numerals enclosed in squares (thick full lines) are virtual port numbers attached to the domain node. Other numerals are port numbers of the communication node N#1.

In the example shown in FIG. 5, the control apparatus that controls the communication nodes of the domain virtualizes the domain configured by the communication nodes N#1 to N#8, and generates a domain node having virtual port numbers 32 to 35. A detailed description of this operation is given below.

The virtual topology management unit 151 retrieves a link (external link) to be used in connecting with another domain and a port thereof, in the virtualized domain. The retrieved external link and port correspond to a link and port of a domain node generated by virtualization of a domain. In the example of FIG. 5, the virtual topology management unit 151 recognizes a link of each communication node of the communication nodes EN#1 to EN#4 as an external link.

The virtual port number management unit 152 assigns a new virtual port number to the retrieved external link. The virtual port number management unit 152 retrieves the new virtual port number from a port number DB. It is to be noted that the port number DB may have content that is in common with another domain. In this case, the common port number DB is formed by exchanging information among control apparatuses managing respective domains. The virtual port number is a virtual port number of a domain node generated by virtualization. In order to assign a unique virtual port number, the virtual port number management unit 152 performs assignment from unused virtual port numbers.

The path tree calculation unit 153 calculates a path based on a domain node belonging to a virtualized domain, in order to realize packet forwarding by a domain node generated by virtualization.

Figure 6:
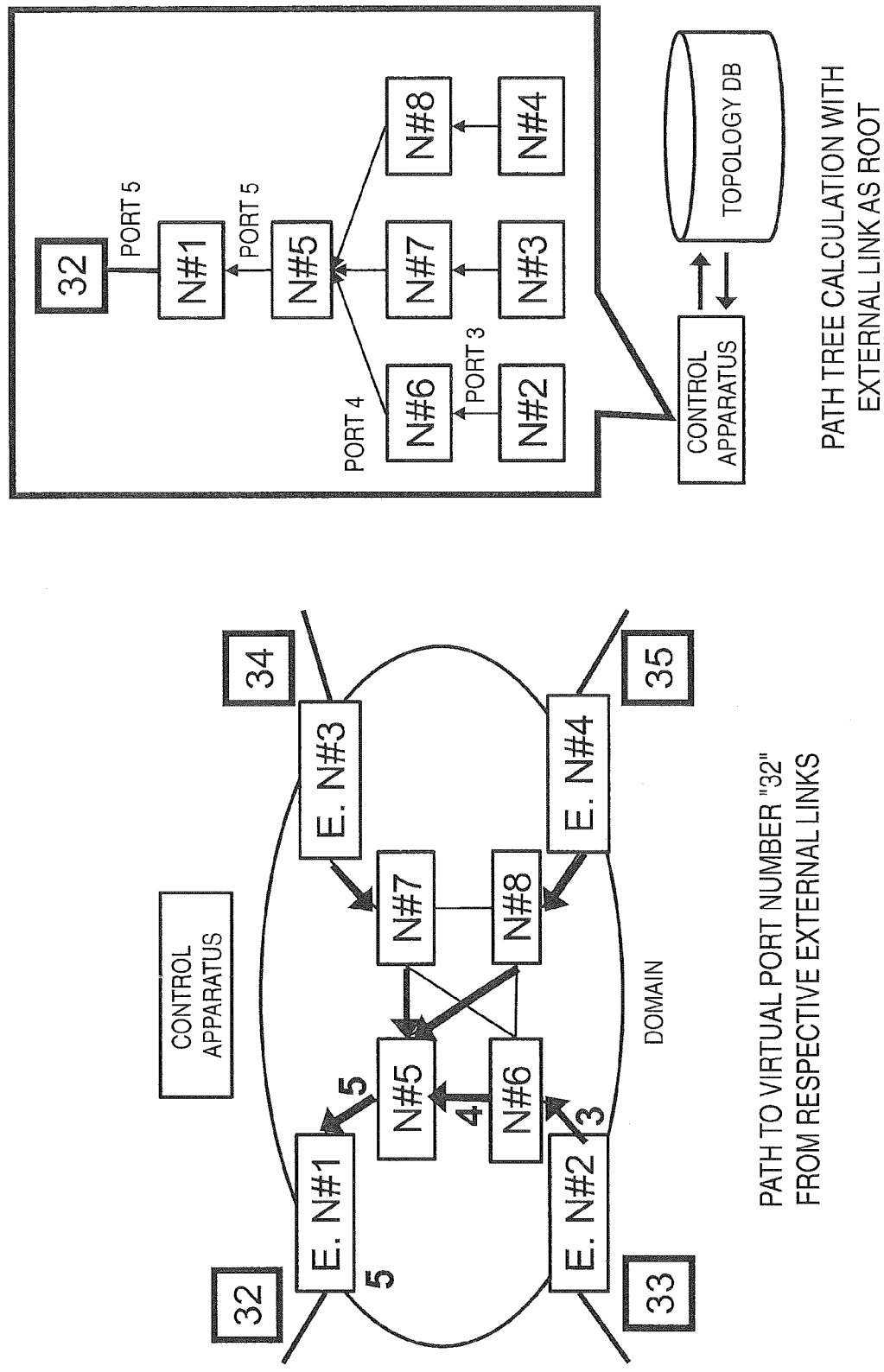
FIG. 6 is a diagram for describing an operational example of the exemplary embodiment.

A description is given concerning path calculation by the path tree calculation unit 153, making reference to FIG. 6.

For example, a description is given concerning a case of calculating a path corresponding to a packet to be outputted to a virtual port whose virtual port number is "32." The path tree calculation unit 153 performs calculation so that the communication node N#1, which corresponds to an egress link to which the virtual port number "32" is assigned, forms the root of a path tree. Here, the virtual port number "32" is assigned to a link corresponding to N#1, and an upward path tree directed towards the root node (N#1) from leaf nodes (N#2, N#3, N#4) is calculated as shown in FIG. 6.

For a packet to be outputted to the virtual port whose virtual port number is "32," in a case of forwarding from N#2 to N#1, referring to the path tree a path is calculated in which the packet is forwarded in the sequence of port number 3 of N#2, port number 4 of N#6, port number 5 of N#5, and port number 5 of N#1. With regard to the virtual port number "32," other paths are calculated in the same way. A similar calculation method is used also for virtual port numbers "33" to "35."

Based on a result of calculation by the path tree calculation unit 153, the processing rule setting request unit 154 requests the domain management unit 14 to set a processing rule in a communication node.

According to the request from the processing rule setting request unit 154, the domain management unit 14 sets a processing rule in the communication node. For example, based on a calculation result of the path tree calculation unit 153, a processing rule is set in N#2, prescribing forwarding to port number 3 a packet whose identifier shows the virtual port number "32." The domain management unit 14 sets a processing rule in N#6, prescribing forwarding to port number 4 a packet whose identifier shows the virtual port number "32." The domain management unit 14 sets a processing rule in N#5, prescribing forwarding to port number 5 a packet whose identifier shows the virtual port number "32." The domain management unit 14 sets a processing rule in EN#1 that corresponds to an external link, prescribing forwarding to port number 5 a packet whose identifier shows the virtual port number "32," and incrementing (or decrementing) a count value contained in the packet. The domain management unit 14 executes setting of the processing rule corresponding to the virtual port number "32" in another communication node also within the domain, by a similar procedure. The domain management unit 14 executes setting of a processing rule corresponding to other virtual port numbers "33" to "35" in a communication node within the domain, by a similar procedure.

By the above operation, the control apparatus generates a domain node by virtualization of communication nodes of a domain.

Figure 7:
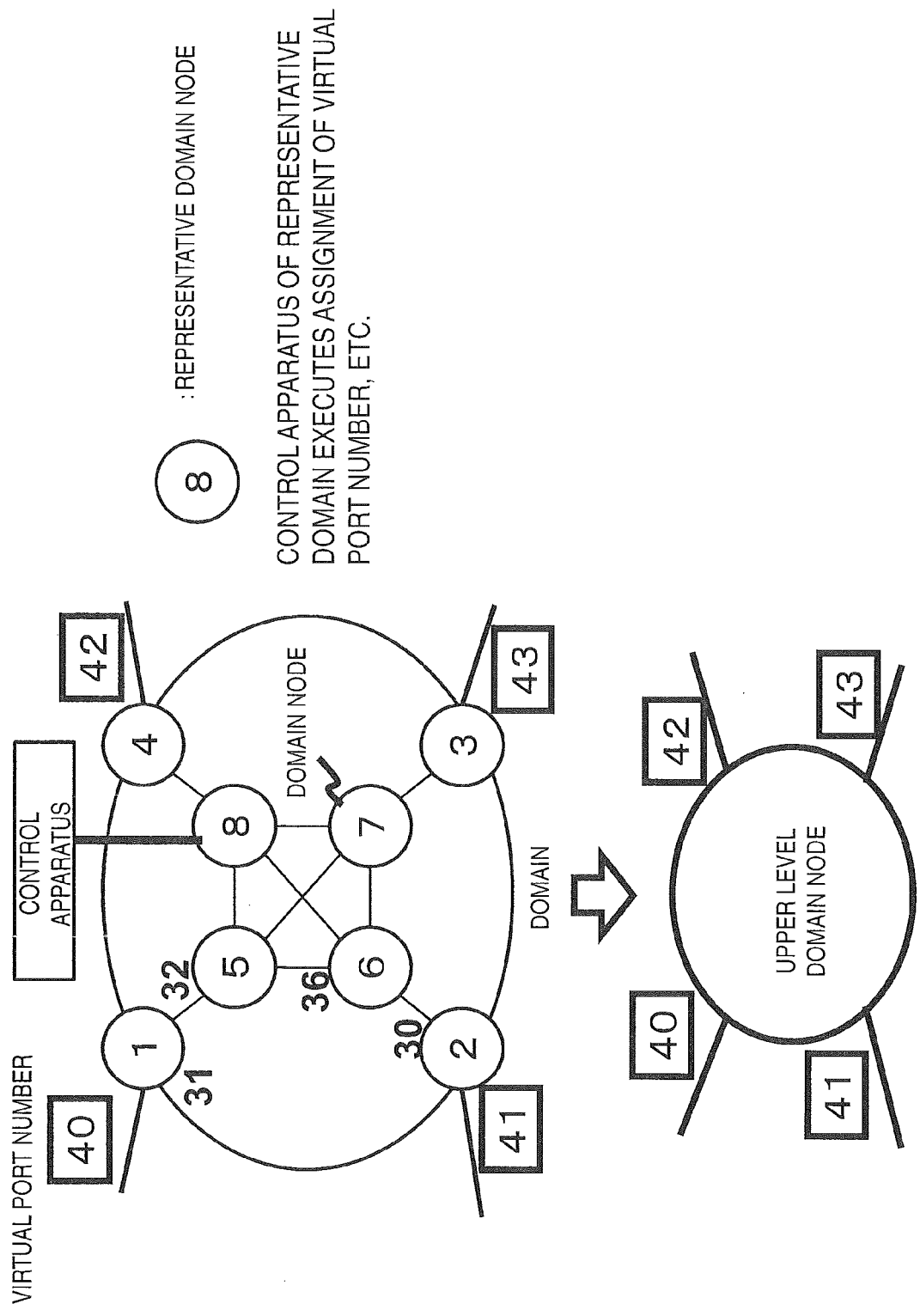
FIG. 7 is a diagram for describing an operational example of the exemplary embodiment.

Next, referring to FIG. 7, a description is given of an operational example of further virtualization of a domain configured from domain nodes generated by virtualization of communication nodes, and generating an upper level domain node.

Among domain nodes belonging to the domain, for example one domain node is a representative domain node, and processing to generate an upper level domain node is executed. In the example of FIG. 7, domain node 8 is the representative domain node. It is to be noted that it is also possible to not select a representative domain node, but to execute processing to generate an upper level domain node by collaboration of respective control apparatuses corresponding to respective domain nodes.

Operation of the virtual topology management unit 151, the virtual port number management unit 152, and the path tree calculation unit 153 of the control apparatus of the representative domain node is the same as content described with reference to FIG. 5 and FIG. 6, and a description is omitted. However, with regard to a virtual port number assigned by the virtual port number management unit 152, a unique port number is used by all domain nodes belonging to this domain.

Figure 8:
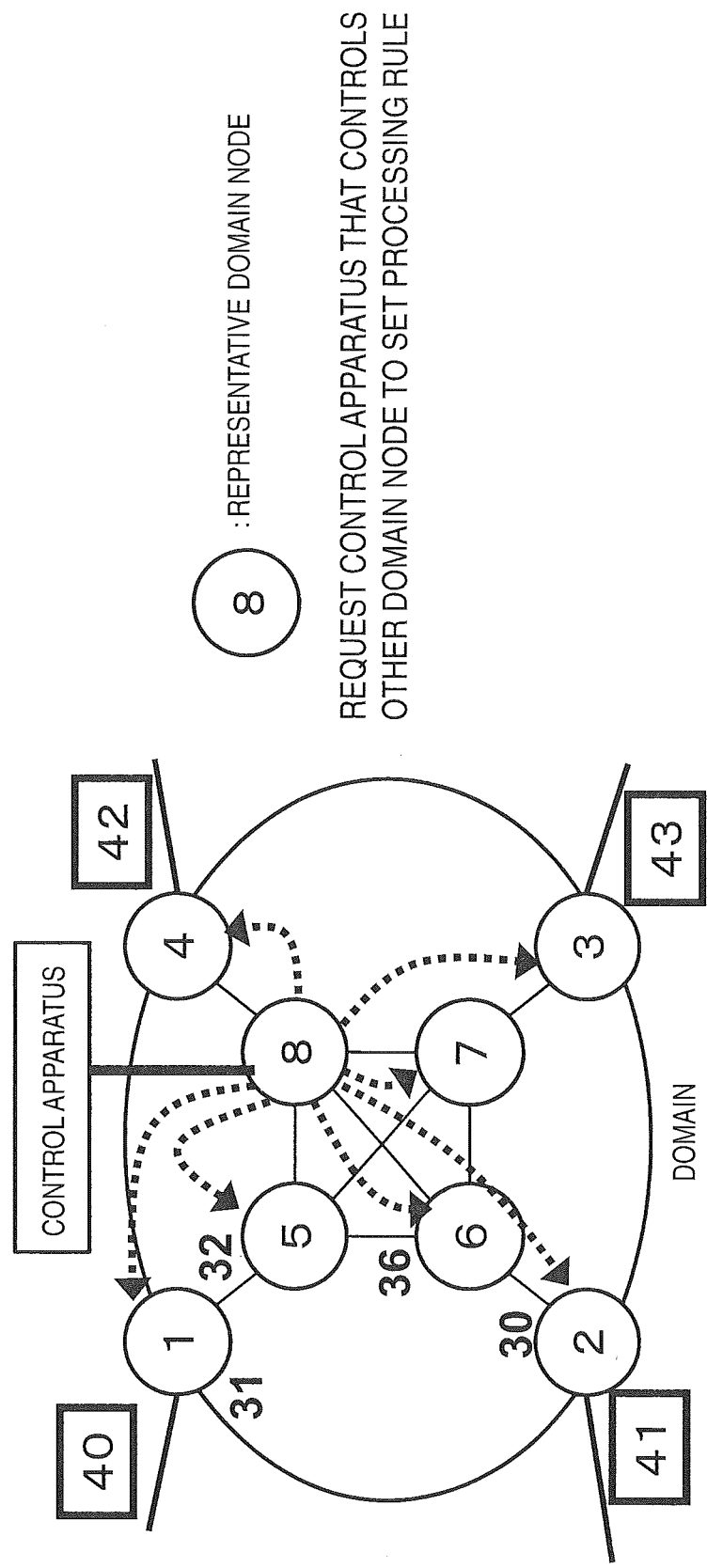
FIG. 8 is a diagram for describing an operational example of the exemplary embodiment.

The path tree calculation unit 153 calculates respective paths to each external link (in FIG. 7, links to which virtual port numbers "40" to "43" are assigned) of the domain. A virtual port number of each domain node is detected, corresponding to respective paths to the respective external links, from paths calculated by the path tree calculation unit 153. As shown in FIG. 8, a control apparatus of the representative domain node 8 requests control apparatuses corresponding to other domain nodes to calculate a path corresponding to the detected virtual port numbers and to set a processing rule corresponding to the calculated path (broken line arrow in FIG. 8).

For example, referring to FIG. 8, a packet to be outputted from an external link with the virtual port number "40" is forwarded in the order of virtual port number 30 of domain node 2, virtual port number 36 of domain node 6, virtual port number 32 of domain node 5, and virtual port number 31 of domain node 1. In this example, the control apparatus of the representative domain node 8 requests a control apparatus corresponding to the domain node 2 to calculate a path to the virtual port number 30 by a path within a domain to which the domain node 2 belongs. The path calculation by the control apparatus of the domain node 2 is similar to a method described with reference to FIG. 5 and FIG. 6. The control apparatus corresponding to the domain node 2 sets a processing rule corresponding to the calculated path in each communication node by association with the virtual port number "40." That is, the control apparatus corresponding to the domain node 2 sets a processing rule for execution with respect to a packet corresponding to the virtual port number "40," in each communication node. The virtual port number "40" is a virtual port number of an upper level domain node generated by virtualization. Therefore, the communication node within the domain to which the domain node 2 belongs can execute an operation corresponding to the virtual port number "40" of the upper level domain node. The control apparatus of the representative domain node 8 makes a similar request to the control apparatus of another domain node. The control apparatus that receives the request sets in the communication node a processing rule corresponding to the respective virtual port numbers "40" to "43" of the upper level domain node.

Figure 9:
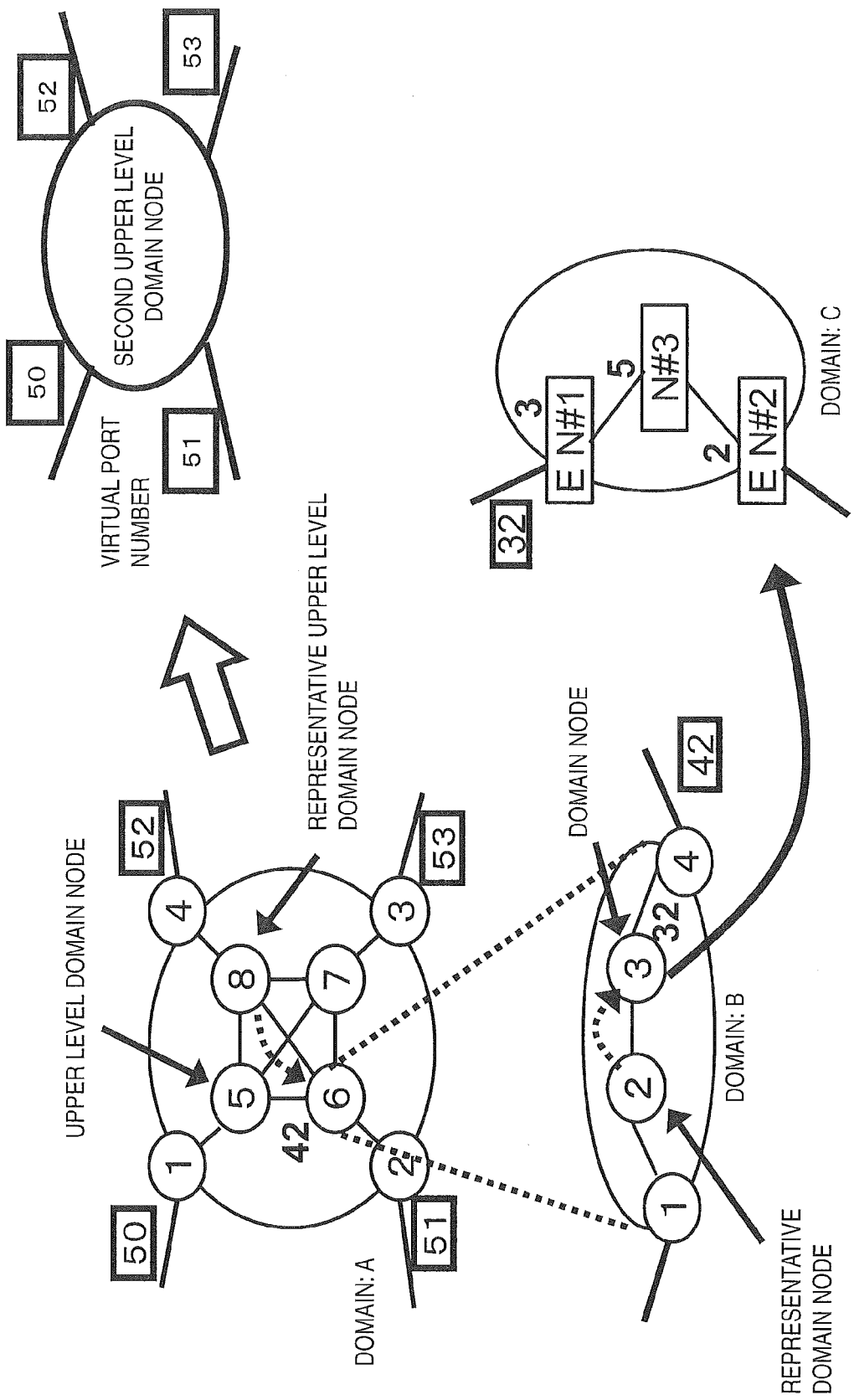
FIG. 9 is a diagram for describing an operational example of the exemplary embodiment.

Next, referring to FIG. 9, a description is given of an operational example of further virtualization of an upper level domain node generated by virtualization, and of generating a higher second upper level domain node.

Among the domain nodes belonging to domain A, for example, one domain node is a representative upper level domain node, and executes processing to generate a second upper level domain node. In FIG. 9, domain node 8 is the representative upper level domain node. It is to be noted that it is also possible to not select a representative upper level domain node, but to execute processing to generate the second upper level domain node by collaboration of respective control apparatuses corresponding to respective domain nodes.

Operation of the virtual topology management unit 151, the virtual port number management unit 152, and the path tree calculation unit 153 of the control apparatus of the representative upper level domain node 8 is the same as content described with reference to FIG. 5 and FIG. 6, and a description is omitted. The control apparatus of the representative upper level domain node 8 virtualizes the domain A, and generates the second upper level domain node having virtual port numbers "50" to "53."

The path tree calculation unit 153 calculates respective paths to each external link (in FIG. 9, links to which virtual port numbers "50" to "53" are assigned) of the domain A. A virtual port number of each upper level domain node is detected, corresponding to respective paths to the respective external links, by the path tree calculation unit 153. The control apparatus of the representative upper level domain node 8 requests the virtual port numbers of the detected upper level domain nodes and calculation of a path corresponding to the virtual port numbers thereof, with respect to a control apparatus corresponding to another domain node. It is to be noted that a case where the respective upper level domain nodes are controlled by one control apparatus and a case where control is by a plurality of control apparatuses may be considered. In the case where the upper level domain nodes are controlled by a plurality of control apparatuses, the control apparatus of the representative upper level domain node 8 sends a request to the plurality of control apparatuses. FIG. 9 shows an example where the control apparatus of the upper level domain node 8 makes a request to the control apparatus of the upper level domain node 6. In FIG. 9, an operation where the control apparatus of the upper level domain node 8 makes a request to another upper level domain node is omitted. Below, a description is given exemplifying a case where the control apparatus of the representative upper level domain node 8 sends a request to the upper level domain node 6. The control apparatus of the representative upper level domain node 8 sends a request similar to the description below, to the control apparatus corresponding to another upper level domain node. It is to be noted that this request is sent for each of the respective virtual port numbers "50" to "53" of the second upper level domain node generated by virtualization.

The control apparatus of the representative upper level domain node 8 calculates that the virtual port number of the upper level domain node is "42," corresponding to a path to the virtual port number "50" of the second upper level domain node generated by virtualization. The control apparatus of the representative domain node 8 sends the calculation of the path corresponding to the virtual port number "42" to a control apparatus corresponding to the upper level domain node 6.

The control apparatus corresponding to the upper level domain node 6 that receives the request confirms that the upper level domain node 6 has generated the domain B to which the domain nodes 1 to 4 belong, by virtualization. Therefore, the control apparatus recognizes that configuration of the domain B is by virtualized domain nodes, and is not a domain configured by the communication nodes. In this case, the control apparatus does not set a processing rule corresponding to a request from the control apparatus of the representative upper level domain node 8 in the communication node, but sends a request for setting a processing rule to a lower level control apparatus.

Among the domain nodes 1 to 4 belonging to the domain B, the control apparatus corresponding to the representative domain node 2 calculates a path to the virtual port number "42" corresponding to an external link of the domain B. The path calculation method is similar to the method described with reference to FIG. 5 and FIG. 6, and a description thereof is omitted. The control apparatus of the representative domain node 2 detects a virtual port number of each domain node corresponding to the path to the virtual port number "42." The control apparatus of the representative domain node 2 requests the virtual port numbers of the respective domain node that are detected and calculation of the path corresponding to the virtual port numbers, with respect to a control apparatus corresponding to another domain node. For example, the control apparatus of the representative domain node 2 detects that a virtual port number "32" of the domain node 3 is a virtual port corresponding to the path to the virtual port number "42." The control apparatus of the representative domain node 2 requests the virtual port numbers of the detected domain nodes and calculation of the path corresponding to the virtual port numbers thereof, with respect to a control apparatus corresponding to the domain node 3. It is to be noted that the control apparatus of the representative domain node 2 includes in the request a virtual port number "50" of the second upper level domain node, for sending.

When the control apparatus of the domain node 3 receives the request, a path corresponding to the virtual port number "32" is calculated. The path calculation method is similar to the method described with reference to FIG. 5 and FIG. 6, and a description thereof is omitted. The control apparatus of the domain node 3 recognizes that the domain node 3 is generated by virtualization of the communication nodes N#1 to N#3. Therefore, the control apparatus of the domain node 3 detects port numbers of the communication nodes corresponding to the calculated path, calculates a processing rule based on the detected port numbers, and performs setting with respect to each communication node. It is to be noted that the control apparatus of the domain node 3 performs setting by associating a processing rule to be set in a communication node with the virtual port number "50" of the second upper level domain node. For example, in FIG. 9, the control apparatus sets a processing rule in N#3, prescribing that a packet corresponding to the virtual port number "50" be sent from the port number 5. The control apparatus sets a processing rule in EN#1 prescribing that a packet corresponding to the virtual port number "50" be sent from port number 3, and that a counter value contained in the packet be incremented (or decremented). By a processing rule corresponding to a virtual port number of the second upper level node being set in each communication node, it is possible to implement virtual operation by the second upper level domain node by operation of communication nodes.

A hierarchical virtualized network is built by repeating operations described in FIG. 5 to FIG. 9, as above.

The processing device calculates, as a path for packet forwarding, a packet forwarding path based on virtualized network topology. With regard to topology according to the virtualized domain, since the number of hops and management entities is less than with a topology configured by the communication nodes, the path calculation load is reduced. It is to be noted that the hierarchical virtualized network topology, for example, is common to a plurality of control apparatuses, and the respective control apparatuses can calculate a packet path based on the hierarchical virtualized network topology. A control apparatus that supervises the plurality of control apparatuses may manage the hierarchical virtualized network topology, calculate packet paths based on topology information thereof, and support packet forwarding by the calculated paths for each of the control apparatuses.

Figure 10:
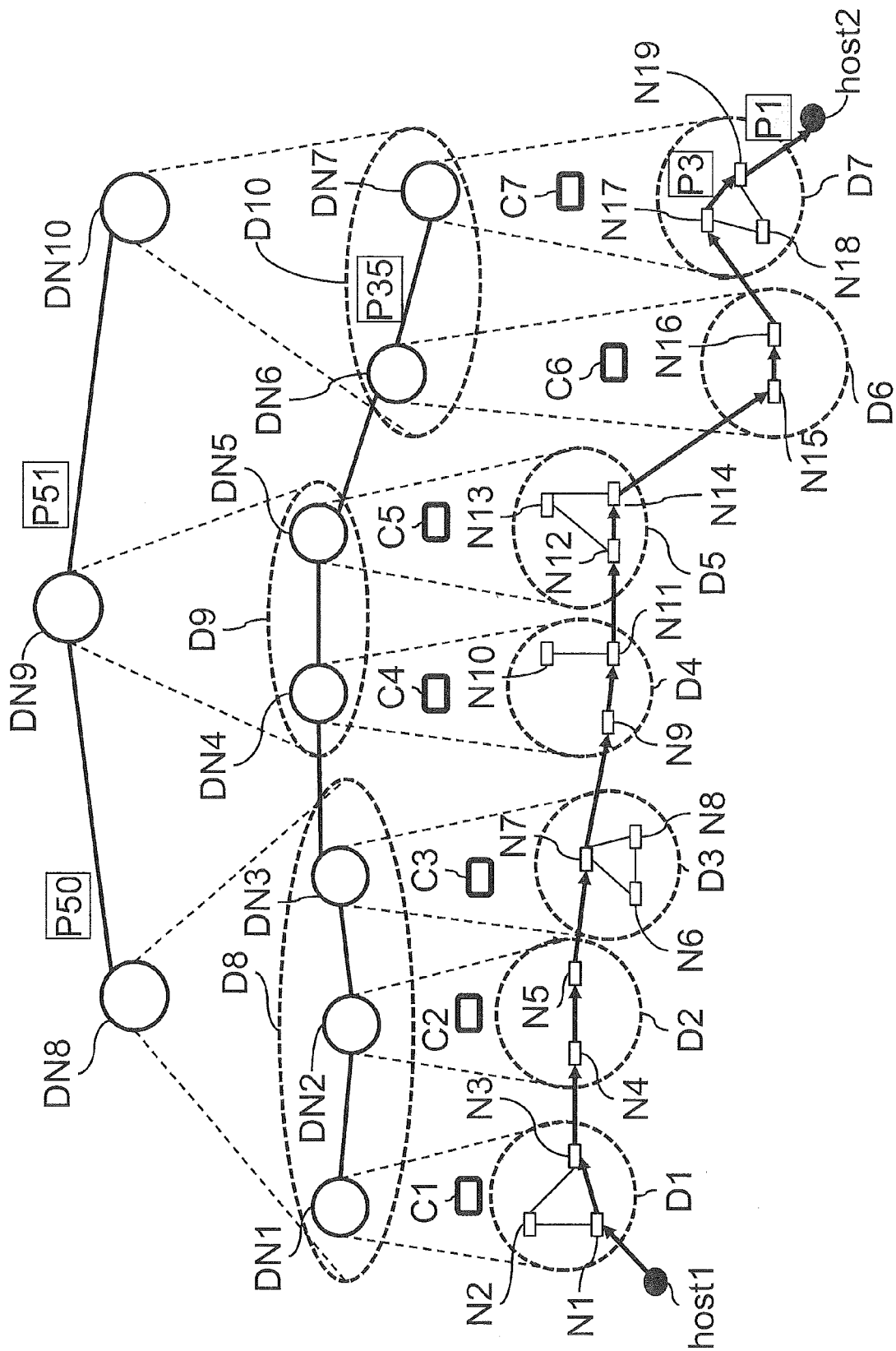
FIG. 10 is a diagram representing an operational outline of the exemplary embodiment.
Figure 11:
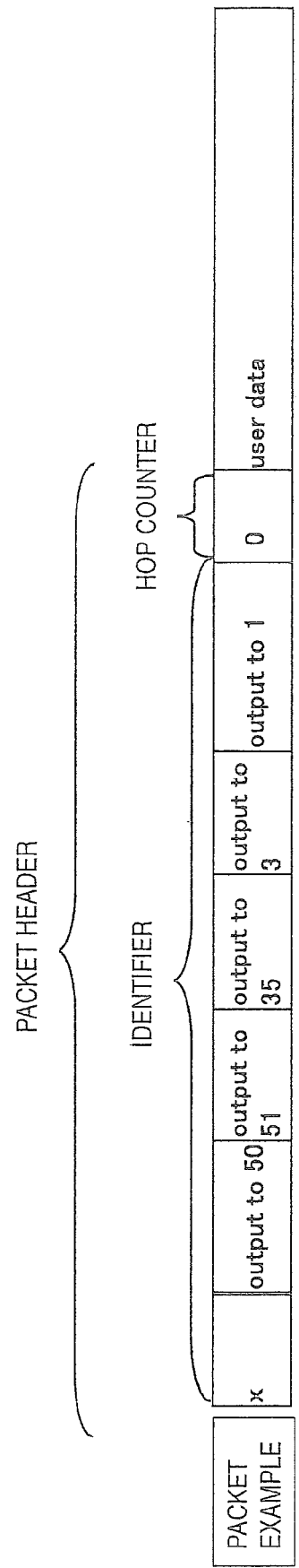
FIG. 11 is a diagram showing a configuration example of a packet transmitted when communication is performed between host1 and host2 in the exemplary embodiment.

A description is given of an example of a packet forwarding operation after the virtualized network has been built, making reference to FIG. 10 and FIG. 11.

P50, P51 and P35 in FIG. 10 indicate some virtual port numbers assigned as output ports of domain nodes, and P3 and P1 indicate some real port numbers of a communication node.

A communication system in FIG. 10 is virtualized in a 3-layer network.

Hosts that perform communication are indicted by host1 and host2.

When a packet is transmitted from host1 to host2, the packet is inputted to communication node N1. On receiving the new packet, communication node N1 makes a query regarding an identifier to be attached to the packet, to the control apparatus C1. Here, a method is described in which the communication node makes a query regarding the identifier to be attached to the packet, to the control apparatus, and the communication node attaches the identifier to the packet. However, a method may also be used where the host makes a query regarding the identifier to be attached to the packet, to any control apparatus among the control apparatuses C1 to C7. The host may obtain the topology from any among the control apparatuses C1 to C7, a path may be calculated in accordance with a policy thereof, and the identifier may be calculated. A server may be provided to notify the identifier to the host.

The control apparatus calculates a path used in communication using 3 layer topology. At this time, it is possible to select the topology layer used in the calculation for each hop, and flexible path selection is possible.

The control apparatus calculates an identifier to be attached to a packet, based on the calculated path. An output port in a node in each layer has this identifier.

Communication node N1 attaches the identifier received from the control apparatus to a packet and retrieves a processing rule corresponding to the identifier. Based on the processing rule corresponding to the identifier, the communication node N1 forwards the packet to the communication node N3.

Referring to FIG. 11, by embedding an identifier line within a packet header, and holding a hop counter, the identifier to be used for each hop is identified. However, it is also possible to use a method of deleting already used identifiers from the top, without using the hop counter.

The identifier to be referred to by the communication node N1 is 50, and this indicates an output port in a node in the highest level layer. A processing rule corresponding to the identifier 50 is already set in a communication node included in DN8. In this case, processing rules by the communication nodes N1, N3, N4 and N5 that receive the packet are the same as in the processing rule table A of FIG. 3, and the packet is forwarded while continuing to refer to the identifier 50 within the packet. In the communication node N7, a processing rule is similar to the processing rule table B of FIG. 3, and after adding to the hop counter, output is performed from N7, which is a real port equivalent to port 50 in DN8, to a link to N9. In this way, output is performed to an egress link of DN8 using the top identifier 50 included in the packet. In the packet inputted to the communication node N9, the identifier to be referred to is 51; forwarding as far as N15 is continued in the same way, and the hop counter is added to.

The identifier referred to by the communication node N15 is 35, and this represents a node in an upper level second hierarchy and a port 35 in DN6. In this case, forwarding is performed as far as communication node N17, and the hop counter is added to at the final forwarding.

The identifier 35 referred to by the communication node N17 is 3, and this represents a real port number of a communication node. Therefore forwarding is performed to the communication node N19 that is the next hop in the lowest layer, and the top counter is added to.

The identifier referred to by the communication node N19 is 1, forwarding to the next hop is similarly performed, and forwarding to host2 is performed.

The packet is forwarded in the virtualized network as in the above operational example.

As described above, packet forwarding can be performed by adding an identifier for a hop in each layer to a packet, and it is possible to reduce the number of identifiers added.

A description of respective exemplary embodiments of the present invention has been given above, but the present invention is not limited to the abovementioned embodiments. Further modifications, substitutions and adjustments may be added within a scope that does not depart from fundamental technical concepts of the present invention. For example, in the respective exemplary embodiments described above a description has been given making reference to OpenFlow technology, but the present invention is not limited to being based on OpenFlow technology.

Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclose even without specific recital thereof.

1 to 3 communication node
10 control apparatus
11 node communication unit
12 control message processing unit
13 flow entry management unit
14 domain management unit
15 virtualization management unit
100 virtual node
141 domain topology management unit
142 path tree calculation unit
143 processing rule calculation unit
151 virtual topology management unit
152 virtual port number management unit
153 path tree calculation unit
154 processing rule setting request unit
C1 to C7 control apparatus
D1 to D10 domain
DN1 to DN10 domain node
N1 to N19 communication node
P1, P3 some real port numbers
P35, P50, P51 some virtual port numbers

What is claimed is:

1. A communication system, comprising:
a plurality of communication nodes; and
an external control apparatus that externally controls packet processing of the plurality of communication nodes,
wherein the external control apparatus comprises:
a virtualization unit that configures a virtual node(s) from a plurality of communication nodes among the plurality of communication nodes;
a control unit that sets a processing rule for a packet in at least one communication node of the plurality of communication nodes included in the virtual node(s), so that the at least one communication node executes packet processing corresponding to an operation of the virtual node(s); and
a path calculation unit that calculates a forwarding path of a packet, based on a virtual network topology including the virtual node(s), and
wherein the plurality of communication nodes process a packet corresponding to the forwarding path, in accordance with the processing rule.

2. The communication system according claim 1, wherein the external control unit sets the processing rule in at least one of the plurality of communication nodes included in the virtual node(s), so that a packet is forwarded to a communication node corresponding to a virtual port of the virtual node(s).

3. The communication system according to claim 1, wherein the external control unit associates the processing rule with an identifier representing a virtual port of the virtual node(s) and sets the association in at least one of the plurality of communication nodes included in the virtual node(s).

4. The communication system according to claim 3, wherein the plurality of communication nodes, in a case of receiving a packet corresponding to the identifier, process the packet in accordance with the processing rule associated with the identifier.

5. The communication system according to claim 3, wherein the plurality of communication nodes, in a case of receiving a packet including the identifier, process the packet in accordance with the processing rule associated with the identifier.

6. The communication system according to claim 5, wherein a communication node corresponding to the virtual port, when processing a packet including the identifier, processes the packet so that the identifier is not referred to by another communication node.

7. The communication system according to claim 1, wherein the virtualization unit configures an upper level virtual node(s) from a plurality of virtual nodes, among a plurality of the virtual nodes,
wherein the control unit sets a processing rule for a packet in at least one virtual node of the plurality of virtual nodes included in the upper level virtual node(s), so that the at least one virtual node executes packet processing corresponding to an operation of the upper level virtual node(s),
wherein the path calculation unit calculates a forwarding path of a packet, based on an upper level virtual network topology including the upper level virtual node(s), and
wherein the plurality of communication nodes process a packet corresponding to the forwarding path, in accordance with the processing rule.

8. The communication system according to claim 1, wherein the external control apparatus includes a node that is arranged independently from the communication nodes.

9. The communication system according to claim 8, wherein the external control apparatus centrally controls packet forwarding performed by the communication nodes.

10. The communication system according to claim 1, wherein the external control apparatus centrally controls packet forwarding performed by the communication nodes.

11. An external control apparatus that controls packet processing of a plurality of communication nodes, the external control apparatus comprising:
a virtualization unit that configures a virtual node(s) including a plurality of communication nodes among the plurality of communication nodes;
a control unit that sets a processing rule for a packet in at least one communication node of the plurality of communication nodes included in the virtual node(s), so that the at least one communication node executes packet processing corresponding to an operation of the virtual node(s); and
a path calculation unit that calculates a forwarding path of a packet, based on a virtual network topology including the virtual node(s).

12. The external control apparatus according to claim 11, wherein the control unit sets the processing rule in at least one of the plurality of communication nodes included in the virtual node(s), so that a packet is forwarded to a communication node corresponding to a virtual port of the virtual node(s).

13. The external control apparatus according to claim 11, wherein the control unit associates the processing rule with an identifier representing a virtual port of the virtual node(s) and sets the association in at least one of the plurality of communication nodes included in the virtual node(s).

14. The external control apparatus according to claim 11, wherein the virtualization unit configures an upper level virtual node(s) from a plurality of virtual nodes, among a plurality of the virtual nodes,
wherein the control unit sets a processing rule for a packet in at least one virtual node of the plurality of virtual nodes included in the upper level virtual node(s), so that the at least one virtual node executes packet processing corresponding to an operation of the upper level virtual node(s),
wherein the path calculation unit calculates a forwarding path of a packet, based on the upper level virtual network topology including the upper level virtual node(s), and the plurality of communication nodes process a packet corresponding to the forwarding path, in accordance with the processing rule.

15. A communication method, comprising:
configuring, by an external control apparatus that controls packet processing of a plurality of communication nodes, a virtual node(s) from a plurality of communication nodes among the plurality of communication nodes;
setting a processing rule for a packet in at least one communication node of the plurality of communication nodes included in the virtual node(s), so that the at least one communication node executes packet processing corresponding to an operation of the virtual node(s); and
calculating a forwarding path of a packet, based on a virtual network topology including the virtual node(s).

16. The communication method according to claim 15, wherein the external control apparatus sets the processing rule in at least one of the plurality of communication nodes included in the virtual node(s), so that a packet is forwarded to a communication node corresponding to a virtual port of the virtual node(s).

17. The communication method according to claim 15, wherein the external control apparatus associates the processing rule with an identifier representing a virtual port of the virtual node(s) and sets the association in at least one of the plurality of communication nodes included in the virtual node(s).

18. The communication method according to claim 15, comprising:
by the external control apparatus, configuring an upper level virtual node(s) from a plurality of virtual nodes, among a plurality of the virtual nodes;
setting a processing rule for a packet in at least one virtual node of the plurality of virtual nodes included in the upper level virtual node(s), so that the at least one virtual node executes packet processing corresponding to an operation of the upper level virtual node(s); and
calculating a forwarding path of a packet, based on the upper level virtual network topology including the upper level virtual node(s).

19. A communication node, that is used in a communication system comprising an external control apparatus that controls packet processing of a plurality of communication nodes, the communication node being one communication node among the plurality of communication nodes, wherein the external control apparatus further comprises:
a virtualization unit that configures a virtual node(s) from a plurality of communication nodes among the plurality of communication nodes;
a control unit that sets a processing rule for a packet in at least one communication node of the plurality of communication nodes included in the virtual node(s), so that the at least one communication node executes packet processing corresponding to an operation of the virtual node(s); and a path calculation unit that calculates a forwarding path of a packet, based on a virtual network topology including the virtual node(s), and wherein the communication node processes a packet corresponding to the forwarding path in accordance with the processing rule.

20. The communication node according to claim 19, wherein the external control apparatus associates the processing rule with an identifier representing a virtual port of the virtual node(s) and sets the association in at least one of the plurality of communication nodes included in the virtual node(s), and wherein the communication node, in a case of receiving a packet corresponding to the identifier, processes the packet in accordance with the processing rule associated with the identifier.

* * * * *